US009995915B2

(12) United States Patent
Ohzawa

(10) Patent No.: US 9,995,915 B2

(45) Date of Patent: Jun. 12, 2018

(54) PRISM BLOCK FOR SUPPRESSING DECREASE OF AMOUNT OF LIGHT BY MEDIUM, OPTICAL UNIT, AND SCANNER OPTICAL SYSTEM

(71) Applicant: Konica Minolta, Inc., Chiyoda-ku, Tokyo (JP)

(72) Inventor: Satoko Ohzawa, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/397,127

(22) Filed: Jan. 3, 2017

(65) Prior Publication Data

US 2017/0192202 A1 Jul. 6, 2017

(30) Foreign Application Priority Data

Jan. 5, 2016 (JP) ................................ 2016-000382

(51) Int. Cl.

| | |
|---|---|
| ***H04N 1/04*** | (2006.01) |
| ***G02B 13/00*** | (2006.01) |
| ***G02B 27/00*** | (2006.01) |
| ***H04N 1/193*** | (2006.01) |
| ***H04N 1/028*** | (2006.01) |

(52) U.S. Cl.

CPC ......... *G02B 13/007* (2013.01); *G02B 13/001* (2013.01); *G02B 27/0025* (2013.01); *H04N 1/0289* (2013.01); *H04N 1/02895* (2013.01); *H04N 1/1937* (2013.01); *H04N 2201/04763* (2013.01)

(58) Field of Classification Search

CPC ........ G02B 5/04; G02B 6/0018; G02B 13/18; G02B 27/0025; G02B 27/1066; G02B 27/4211; G02B 6/0028; G02B 26/10; G02B 6/32; G02B 7/003; F21V 29/004; F21V 29/763; F21V 33/0056; F21V 7/0091; G06F 3/012

USPC ................................ 358/474, 488, 500, 511

See application file for complete search history.

(56) References Cited

U.S. PATENT DOCUMENTS

| | | | | |
|---|---|---|---|---|
| 6,046,867 | A * | 4/2000 | Rana .................... | G02B 5/1876 359/831 |
| 6,447,122 | B1 * | 9/2002 | Kobayashi ........... | G03B 21/006 353/97 |
| 2001/0017697 | A1 * | 8/2001 | Kanda ................ | G01B 9/02022 356/512 |
| 2002/0141070 | A1 * | 10/2002 | Sawai ................ | G02B 26/0841 359/634 |

(Continued)

FOREIGN PATENT DOCUMENTS

| | | |
|---|---|---|
| JP | 10178526 A | 6/1998 |
| JP | 2000111799 A | 4/2000 |
| JP | 2007017698 A | 1/2007 |

*Primary Examiner* — Negussie Worku

(74) *Attorney, Agent, or Firm* — Cantor Colburn LLP

(57) ABSTRACT

A prism block is provided at least one notch to propagate in the light flux in air, on an optical path from entrance of a light flux via a first portion of the prism block to exit of the light flux via a second portion of the prism block. The notch is configured such that the light flux exiting from inside of the prism block via a first interface of the notch between the prism block and the air re-enters the prism block via a second interface between the air and the prism block, the second interface facing the first interface.

14 Claims, 6 Drawing Sheets

1

2 7 3 102 100 118 116 4 120 6 106 132 114 104 150 112 130 8 108 110

LIGHT FLUX IN FIRST ROUND OF LOOP

109

LIGHT FLUX IN SECOND ROUND OF LOOP

(56) References Cited

U.S. PATENT DOCUMENTS

| | | | | |
|---|---|---|---|---|
| 2003/0030912 | A1* | 2/2003 | Gleckman | G02B 27/0172 359/633 |
| 2006/0268421 | A1* | 11/2006 | Shimizu | G02B 5/32 359/630 |
| 2008/0037136 | A1* | 2/2008 | Tsutsumi | G02B 15/173 359/684 |
| 2008/0284921 | A1* | 11/2008 | Hirata | G02B 27/2278 348/756 |
| 2012/0170000 | A1* | 7/2012 | Imaoka | G02B 27/283 353/20 |
| 2015/0160460 | A1* | 6/2015 | Komatsu | G02B 27/0172 359/629 |
| 2015/0338729 | A1* | 11/2015 | Kawasumi | F21V 7/0091 353/99 |
| 2016/0198060 | A1* | 7/2016 | Tanaka | H04N 1/04 358/474 |
| 2016/0212291 | A1* | 7/2016 | Ohzawa | H04N 1/02835 |

* cited by examiner 100B
102
118
116
120B
6
132
152
106
230
114
240
104
150
220
154
157
112
130
108
110
122
124
210
156

ACHROMAT

APOCHROMAT

PRISM BLOCK FOR SUPPRESSING DECREASE OF AMOUNT OF LIGHT BY MEDIUM, OPTICAL UNIT, AND SCANNER OPTICAL SYSTEM

CROSS REFERENCE TO RELATED APPLICATIONS

This application is based on Japanese Patent Application No. 2016-000382 filed with the Japan Patent Office on Jan. 5, 2016, the entire content of which is hereby incorporated by reference.

BACKGROUND OF THE INVENTION

Field of the Invention

The present disclosure relates to a prism block as well as an optical unit and a scanner optical system, each of which employs the prism block.

Description of the Related Art

In a reduction optical system, a long optical path needs to be provided between a target object and an image capturing element. Conventionally, this long optical path is folded through reflections by mirror surfaces, thereby achieving a reduced size of an optical unit.

However, as image capturing elements have been reduced in size in recent years, optical units are required to be further reduced in size. In view of such a requirement, in some cases, there is used an optical unit configured to cause multiple reflections of a light flux in a prism block.

Regarding such a prism block, Japanese Laid-Open Patent Publication No. 2000-111799 discloses an image formation optical system having a first prism and a second prism. Specifically, the first prism reflects an entered light flux at its first to fourth reflection surfaces, then the reflected light exits from the first prism and enters the second prism. At least one surface of each of the first prism and the second prism has a rotational asymmetrical shape to provide the light flux with power and correct an aberration resulting from eccentricity thereof.

Regarding a technique of reducing the size of an optical unit using a prism block, Japanese Laid-Open Patent Publication No. 10-178526 discloses a configuration in which reflected light from a document enters a prism, the light thus having entered via an entrance surface thereof is reflected by each reflection surface at least once before exiting from an exit surface, and the light is guided to a CCD via a lens to scan image information of the document.

SUMMARY OF THE INVENTION

However, in each of the techniques disclosed in Japanese Laid-Open Patent Publication No. 2000-111799 and Japanese Laid-Open Patent Publication No. 10-178526, a long optical path is provided in the prism block, so that an amount of light is decreased due to a medium of the prism block.

Further, in the technique disclosed in Japanese Laid-Open Patent Publication No. 2000-111799, it is not contemplated that the light flux is reflected at the same reflection surface for a plurality of times. Moreover, the plurality of prism blocks are used as separated members, thus resulting in a large size of the optical unit. Hence, there is required a technique of suppressing an amount of light from being decreased due to a medium as compared with the conventional techniques while suppressing increase in size.

According to a certain embodiment, in a prism block configured to reflect a light flux, entering the prism block via a first portion of the prism block, at least once in the prism block to exit from the prism block via a second portion of the prism block, the prism block is provided with at least one notch to propagate the light flux in air on an optical path from the entrance of the light flux via the first portion to the exit of the light flux via the second portion. The notch is configured such that the light flux exiting from inside of the prism block via a first interface of the notch between the prism block and the air re-enters the prism block via a second interface between the air and the prism block, the second interface facing the first interface.

In a certain aspect, at least one of the first and second interfaces is formed to have a curved shape for diffusing or converging the light flux.

In a certain aspect, the curved shape is configured to correct a chromatic aberration of the light flux.

In a certain aspect, each of the first and second interfaces has an incidence surface on which the light flux is incident, the incidence surface being provided orthogonal to an optical axis of the light flux.

In a certain aspect, in the optical path from the entrance of the light flux via the first portion to the exit of the light flux via the second portion, the prism block is configured to permit the light flux to be incident on a reflection surface at an incident angle of 45°, the reflection surface serving as an interface between inside and outside of the prism block.

In a certain aspect, the prism block is configured such that an optical element is able to be disposed on an optical path from the first interface to the second interface.

In a certain aspect, the prism block is provided by integral molding.

In a certain aspect, the prism block is constituted of a combination of a plurality of prisms.

According to a certain embodiment, an optical unit includes an optical element and a prism block. The prism block is configured to reflect a light flux, entering the prism block via a first portion of the prism block, at least once in the prism block to exit from the prism block via a second portion of the prism block. The prism block is provided with at least one notch to propagate the light flux in air on an optical path from the entrance of the light flux via the first portion to the exit of the light flux via the second portion. The notch is configured such that the light flux exiting from inside of the prism block via a first interface of the notch between the prism block and the air re-enters the prism block via a second interface between the air and the prism block, the second interface facing the first interface. The optical unit has at least one of a first optical element and a second optical element, the first optical element being disposed at a stage before the first portion, the second optical element being disposed at a stage after the second portion.

In a certain aspect, the optical unit has a third optical element on an optical path from the first interface to the second interface.

In a certain aspect, the first, second, or third optical element includes a lens for correcting a chromatic aberration of the light flux.

According to a certain embodiment, a scanner optical system includes: a light source configured to emit a light flux to a document to be scanned; a prism block configured to permit the light flux reflected by the document to enter the prism block via a first portion of the prism block and to reflect the light flux at least once in the prism block to exit from the prism block via a second portion of the prism block, the first portion having a long side direction in a first direction, the second portion having a long side direction in the first direction; and a light receiving portion configured to detect the light flux exiting from the prism block. The prism block is provided with at least one notch to propagate the light flux in air on an optical path from the entrance of the light flux via the first portion to the exit of the light flux via the second portion, the notch having a long side direction in the first direction. The notch is configured such that the light flux exiting from inside of the prism block via a first interface of the notch between the prism block and the air re-enters the prism block via a second interface between the air and the prism block, the second interface facing the first interface.

In a certain aspect, among surfaces of the prism block, a surface on which the light flux is not incident is configured to be in parallel with an optical axis of the light flux close to the surface.

In a certain aspect, a width of the prism block is configured to be narrower on the optical path from the entrance of the light flux via the first portion to the exit of the light flux via the second portion.

The foregoing and other objects, features, aspects and advantages of the disclosed technical feature will become more apparent from the following detailed description of disclosed technical feature when taken in conjunction with the accompanying drawings.

DESCRIPTION OF THE PREFERRED EMBODIMENTS

Figure 1:
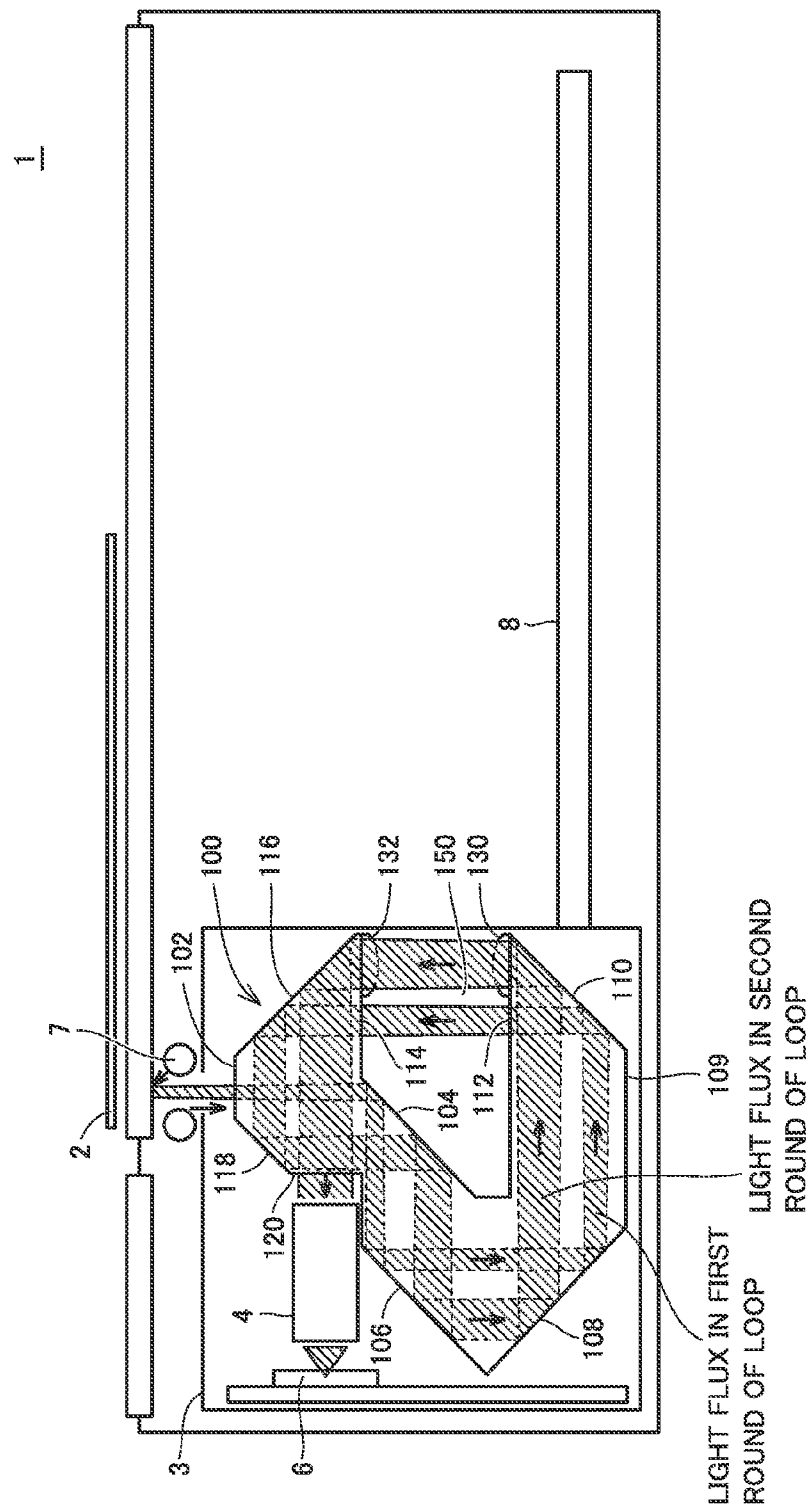
FIG. 1 illustrates an exemplary configuration of a prism block according to a first embodiment as well as exemplary configurations of an optical unit and a scanner optical system to each of which the prism block is applied.

The following describes embodiments of the technical idea in detail with reference to figures. It should be noted that the same or corresponding portions are given the same reference characters in the figures and are not described repeatedly.

A prism block can form a long optical path in a small space by causing multiple reflections of a light flux therein. On the other hand, the prism block has a shortcoming of causing decrease (optical loss) of an amount of light due to its medium. Moreover, there is a limit in suppressing the decrease of amount of light by improving a material used for the prism block.

In view of the above problem, the applicant of the present application has conceived the following new idea: the decrease of amount of light due to the medium of the prism block is suppressed by configuring such that a light flux passes through air on an optical path up to exit of the light flux toward another optical element such as an image formation lens. Hereinafter, this configuration will be described.

A. First Embodiment—Prism Block Provided with Notch

<a1. Configuration of Scanner Optical System>

FIG. 1 is a diagram illustrating an exemplary configuration of a prism block 100 according to a first embodiment as well as exemplary configurations of an optical unit 3 and a scanner optical system 1 to each of which prism block 100 is applied.

With reference to FIG. 1, scanner optical system 1 has optical unit 3 and a rail 8. Optical unit 3 includes a light source 7, prism block 100, an image formation lens 4, and an image capturing element 6. As one example, it is assumed that image capturing element 6 is a line sensor having a plurality of photoelectric conversion elements arranged in a main scanning direction.

In order to scan image information of a document 2, light source 7 emits a light flux toward document 2. Upon the emission of the light flux by light source 7, optical unit 3, which is engaged with rail 8, is moved in parallel with the document surface by an actuator (not shown).

<a2. Configuration of Prism Block 100>

Figure 2A:
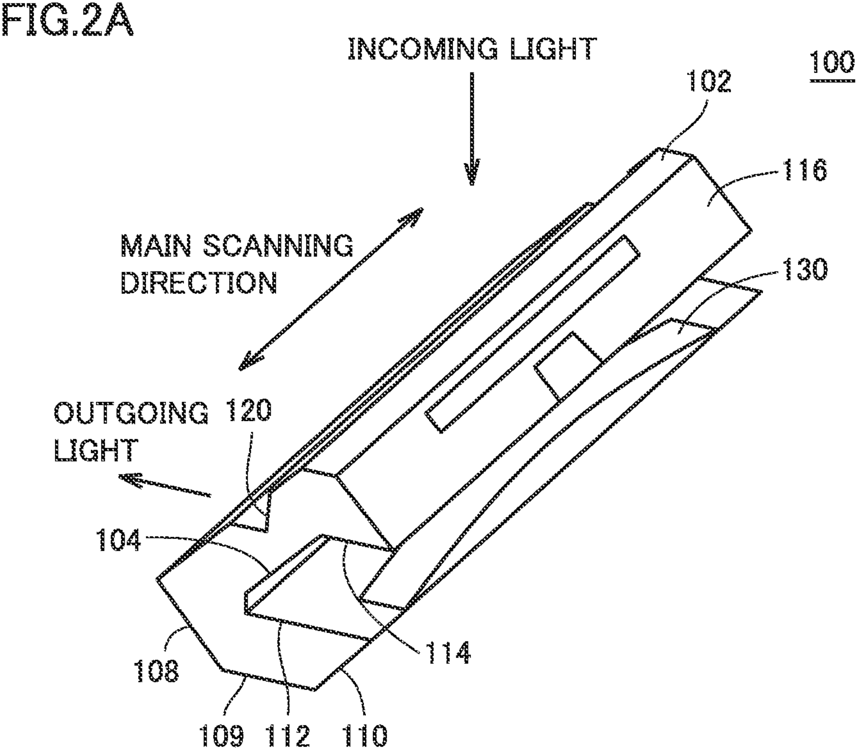
FIG. 2A is a perspective view of the prism block according to the first embodiment.

FIG. 2A is a perspective view of prism block 100 according to the first embodiment. Prism block 100 constitutes a polygonal prism having a long side direction in a main scanning direction as shown in FIG. 2A. The light flux is reflected within prism block 100, thereby folding an optical path between document 2 and image capturing element 6. This leads to a reduced size of optical unit 3.

(a2-1. Material and Production Method)

In order to suppress the decrease (optical loss) of amount of light of the light flux having entered prism block 100, prism block 100 is desirably composed of a material having a transmittance for visible rays as high as possible. Examples of the material of prism block 100 include an acrylic resin and a glass.

Prism block 100 is provided by integral molding, and is therefore configured to have no joint. Accordingly, the amount of light can be suppressed from being decreased at an interface of such a joint in prism block 100.

In another aspect, prism block 100 may be constituted of a combination of a plurality of prisms. Accordingly, prism block 100 can be readily produced as compared with the case of the integral molding, and precision of an interface or the like formed in notch 150 described later can be improved.

(a2-2. Angles of Surfaces of Prism Block 100)

With reference to FIG. 1 again, the light flux emitted from light source 7 is reflected by document 2 and enters prism block 100 via its entrance surface 102. In the present embodiment, the optical axis of the light flux reflected by document 2 is orthogonal to entrance surface 102. Moreover, entrance surface 102 is configured to be in parallel with the placement surface for document 2. It should be noted that in another aspect, an optical element such as an optical filter or a mirror may be disposed on an optical path up to the entrance of the reflected light from document 2 via entrance surface 102, i.e., may be disposed at a stage before entrance surface 102.

The light flux having entered prism block 100 is reflected by reflection surfaces 104, 106, 108, 110, 116, 118. Each of reflection surfaces 104, 106, 108, 110, 116, 118 is an interface between inside of prism block 100 and outside (air) of prism block 100, which are different from each other in refractive index, and is configured to have an angle equal to or more than a critical angle with respect to an incident angle of the light flux. Accordingly, prism block 100 can suppress the decrease of amount of light.

As one example, in the present embodiment, in an optical path on a cross section orthogonal to the main scanning direction of prism block 100, prism block 100 is configured to permit the light flux to be incident on each of reflection surfaces 104, 106, 108, 110, 116, and 118 at an incident angle of 45°. Accordingly, optical paths in prism block 100 become perpendicular or parallel to the placement surface for document 2. Thus, an optical design is facilitated. Furthermore, all the reflection surfaces of prism block 100 form angles of 45°, 135°, 225°, and 315° relative to entrance surface 102 (and installation surface 109), thus facilitating production.

The light flux reflected by reflection surface 118 is totally reflected again by reflection surfaces 104, 106, 108, 110, 116, and then exits to outside via a final exit surface 120. The light flux thus having exited via final exit surface 120 is collected by image formation lens 4 disposed at a stage after final exit surface 120 to form an image on image capturing element 6. Accordingly, the light flux is photoelectrically converted by image capturing element 6 and is output as image information.

Among the surfaces of prism block 100, a surface on which the light flux is not incident, in other words, a surface that does not reflect the light flux or does not permit the light flux to enter and exit therethrough, is preferably configured to be in parallel with the optical axis of the light flux close to the surface.

For example, as shown in FIG. 1, installation surface 109, on which the light flux is not incident, is configured in parallel with the optical axis of the light flux close to installation surface 109. This minimizes a distance from the light flux close to installation surface 109, that is, minimizes unnecessary portions of prism block 100 through which the light flux does not pass. As a result, prism block 100 can be reduced in size.

Furthermore, in the present embodiment, the light flux close to installation surface 109 is in parallel with entrance surface 102 and the placement surface for document 2. Thus, prism block 100 has installation surface 109 as a bottom surface parallel to the placement surface for document 2. Accordingly, prism block 100 is also readily positioned with respect to the placement surface for document 2.

(a2-3. Notch)

Prism block 100 is provided with a notch 150 such that the light flux can be propagated in air on an optical path from the entrance of the light flux from entrance surface 102 to the exit of the light flux from final exit surface 120. As shown in FIG. 2A, notch 150 extends in the same direction as the long side direction (main scanning direction) of prism block 100.

In the present embodiment, the light flux is looped twice in prism block 100 (the light flux crosses itself twice on the optical path from entrance surface 102 to reflection surface 104) before exiting to the outside of prism block 100 via final exit surface 120.

The light flux in a first round of the loop is reflected by reflection surface 110, and then exits to the outside of prism block 100 via a first interface 112. The light flux thus having exited via first interface 112 re-enters prism block 100 through a second interface 114 facing first interface 112.

The light flux in a second round of the loop is reflected by reflection surface 110, and then exits to the outside of prism block 100 via a third interface 130. The light flux thus having exited via third interface 130 re-enters prism block 100 via a fourth interface 132 facing third interface 130.

Each of first interface 112, second interface 114, third interface 130, and fourth interface 132 is an interface of notch 150 between the air and prism block 100.

Since prism block 100 is provided with notch 150, the light flux is propagated in the air on the optical path from the entrance of the light flux via entrance surface 102 to the exit of the light flux via final exit surface 120. Accordingly, prism block 100 can suppress the decrease (optical loss) of amount of light by the medium.

It should be noted that for convenience of description, in the example shown in FIG. 1, the width of notch 150 in the sub-scanning direction is illustrated to be wide, but is actually narrow. Specifically, the width of each of the first to fourth interfaces in the sub-scanning direction should be equal to or more than the width of the light flux in the sub-scanning direction, and the width of notch 150 in the sub-scanning direction may be any width as long as the first to the fourth interfaces can be provided. Accordingly, prism block 100 can suppress an influence of strain resulting from contraction or the like upon production.

The first to fourth interfaces of notch 150 are provided orthogonal to the optical axis of the light flux. Specifically, each of the first to fourth interfaces is provided to have an incidence surface on which the light flux is incident, the incidence surface being provided orthogonal to the optical axis of the light flux. Accordingly, the optical axis of the light flux after passing through notch 150 are not changed from the optical axis of the light flux before passing through notch 150, thereby facilitating the optical design. In addition, even if the optical axis is slightly deviated from its design, an error is less likely to occur.

Light has different refractive indexes depending on wavelengths. A chromatic aberration is caused at each of the first to fourth interfaces between prism block 100 and the outside (air), which have different refractive indexes. Hence, although all of the first to fourth interfaces may be constituted of flat surfaces, it is preferable that at least one of these interfaces is formed to have a curved shape to correct the chromatic aberration.

In the present embodiment, as one example, third interface 130 and fourth interface 132 are formed to have curved shapes to provide power to the light flux. The light flux having entered via entrance surface 102 is refracted at the first to fourth interfaces on the optical path to final exit surface 120, and is accordingly narrowed in its width in the main scanning direction. Therefore, the curved shapes of third interface 130 and fourth interface 132 at the downstream side can be made smaller than curved shapes of first interface 112 and second interface 114 at the upstream side on the optical path. In other words, when third interface 130 and fourth interface 132 are formed to have curved shapes, production variation can be suppressed as compared with a case where first interface 112 and second interface 114 are formed to have curved shapes.

In addition, since prism block 100 provides power to the light flux by the curved shapes of third interface 130 and fourth interface 132, the optical path from document 2 to image capturing element 6 can be reduced and the size of image formation lens 4 can be reduced. In the present embodiment, since prism block 100 is used for the reduction optical system, third interface 130 and fourth interface 132 are preferably configured to provide positive power to the light flux as a whole.

In the present embodiment, prism block 100 is used for scanner optical system 1 (image capturing element 6 serving as a line sensor). Therefore, as shown in FIG. 2A, the curved shapes of third interface 130 and fourth interface 132 are arch shapes each having a short length in the sub-scanning direction and each having a curvature only in the main scanning direction. Accordingly, third interface 130 and fourth interface 132 can provide the light flux with power only in the main scanning direction.

Figure 2B:
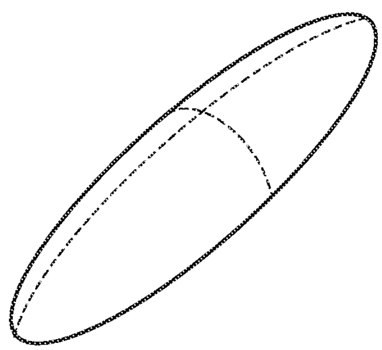
FIG. 2B illustrates an exemplary configuration of a curved shape of each of a third interface and a fourth interface.

It should be noted that in another aspect, as shown in FIG. 2B, each of the curved shapes of third interface 130 and fourth interface 132 may be configured to be an elliptical hemisphere shape having a long side direction in the main scanning direction to provide power in the main scanning direction and the sub-scanning direction.

According to the description above, since prism block 100 according to the present embodiment is provided with notch 150, the decrease (optical loss) of amount of light by the medium can be suppressed. Furthermore, prism block 100 is configured to be in one piece, rather than a plurality of prism blocks constructed as separated blocks. Accordingly, the optical unit can be reduced in size, positional precision can be improved therein, and time and effort can be reduced in adjusting positions of the plurality of prism blocks or the like.

B. Second Embodiment—Width of Prism Block in Main Scanning Direction

In the first embodiment above, prism block 100 is a polygonal prism uniform in the main scanning direction as shown in FIG. 2A, but is not limited to this. In the present embodiment, a prism block 100A is employed which has a non-uniform width in the main scanning direction. It should be noted that the other configurations such as the scanner optical system in the present embodiment are substantially the same as those in the first embodiment, and therefore the following describes only the difference.

Figure 3A:
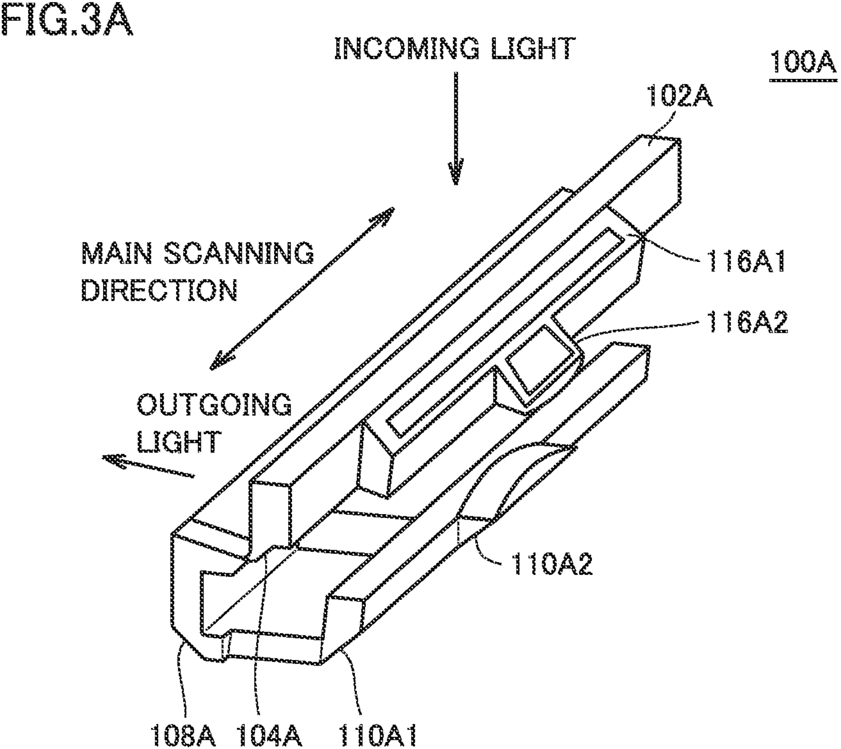
FIG. 3A is a perspective view of a prism block according to a second embodiment.
Figure 3B:
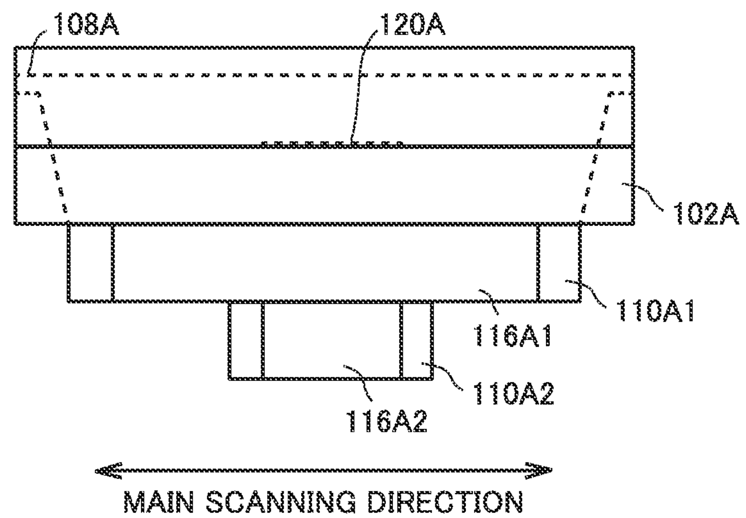
FIG. 3B is a diagram of the prism block according to the second embodiment from above (entrance direction of incoming light).

Each of FIG. 3A and FIG. 3B illustrates prism block 100A according to the second embodiment. FIG. 3A is a perspective view of prism block 100A. With reference to FIG. 3A, also in prism block 100A, the light flux having entered via entrance surface 102A is looped twice in prism block 100A (the light flux crosses itself twice on the optical path from entrance surface 102A to reflection surface 104A) before exiting to the outside of prism block 100A via final exit surface 120A.

As described above, as the light flux having entered via entrance surface 102A travels from the upstream (entrance surface 102A) to the downstream (final exit surface 120A) on the optical path to final exit surface 120A, the light flux is refracted at the first to fourth interfaces, thus narrowing the width of the light flux in the main scanning direction. The width of prism block 100A in the main scanning direction is configured to be stepwisely narrowed, in accordance with the reduction of the width of the light flux in the main scanning direction, from the upstream to the downstream on the optical path from entrance surface 102 to final exit surface 120. It should be noted that in another aspect, the width of prism block 100A in the main scanning direction may be configured to be narrowed gradually.

FIG. 3B is a diagram of prism block 100A when viewed from above (entrance direction of the incoming light). With reference to FIG. 3B, for example, the width of reflection surface 110A2 in the main scanning direction in the second round of the loop is configured to be narrower than the width of reflection surface 110A1 in the main scanning direction in the first round of the loop.

According to the description above, prism block 100A according to the present embodiment can be reduced in size as compared with prism block 100 according to the first embodiment. This leads to size reduction of an optical unit and a scanner optical system, each of which employs prism block 100A.

It should be noted that in another aspect, it can be considered to use prism block 100A for a magnification optical system such as a projector or a microscope, rather than the reduction optical system such as scanner optical system 1. In this case, the width of prism block 100A in the main scanning direction is configured to be wider from the upstream to the downstream on the optical path from entrance surface 102 to final exit surface 120.

C. Third Embodiment—Plurality of Notches

In the embodiments above, the prism block has only one notch, but is not limited to this configuration and may be provided with two or more notches.

Figure 4:
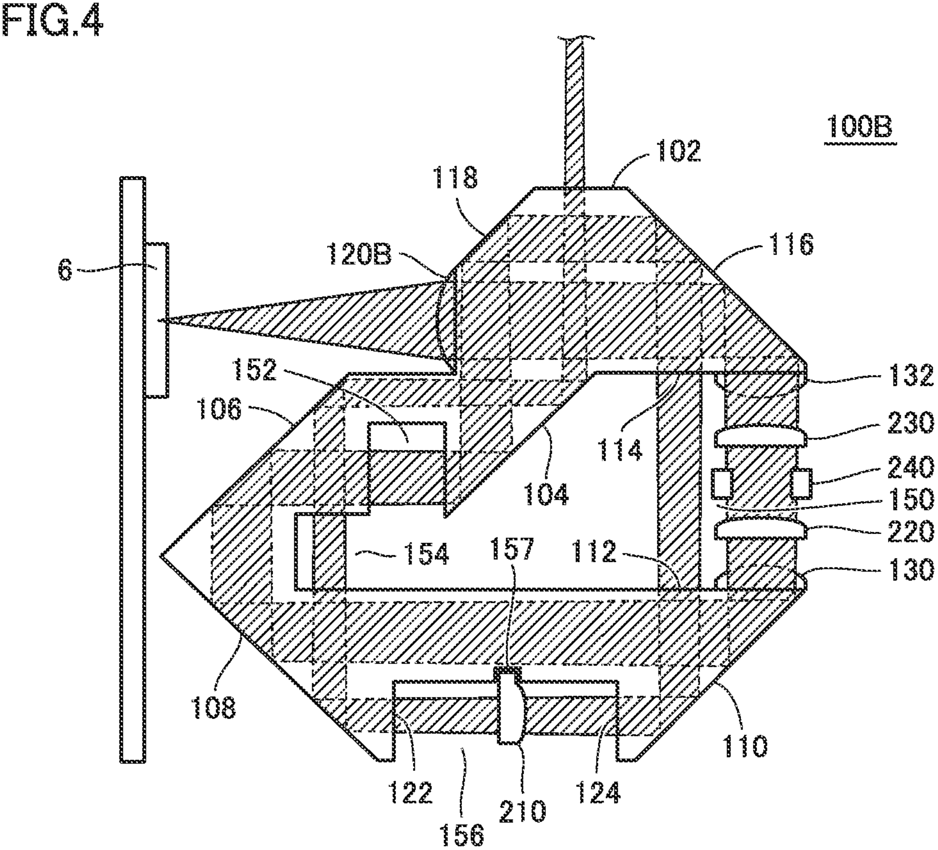
FIG. 4 illustrates an exemplary configuration of a prism block according to each of third to sixth embodiments.

FIG. 4 shows an exemplary configuration of a prism block 100B according to the present embodiment. It should be noted that the other configurations such as the scanner optical system in the present embodiment are substantially the same as those in the first embodiment, and therefore the following describes only the difference.

With reference to FIG. 4, prism block 100B has not only notch 150 but also notches 152, 154, and 156. Accordingly, prism block 100B can further prevent the decrease of amount of light by the medium.

D. Fourth Embodiment—Insertion of Optical Element into Notch

An optical element such as a lens is inserted into a notch of the prism block according to the present embodiment. With reference to FIG. 4, in prism block 100B according to the present embodiment, lenses 220, 230 and diaphragm 240, which are optical elements, are provided between third interface 130 and fourth interface 132 of notch 150.

According to the configuration above, an image can be formed from the light flux on image capturing element 6 by these optical elements and the curved shape of final exit surface 120B or a combination of the curved shapes of third interface 130 and fourth interface 132 with the optical elements and the curved shape of final exit surface 120B. Accordingly, image formation lens 4 used in the foregoing embodiments can be omitted in prism block 100B according to the present embodiment, thereby attaining further size reduction of the optical unit.

In another aspect, an optical element may be inserted into the notch, such as an element for changing the optical path of the light flux or an element for limiting the wavelength region of the light flux. Examples of such other optical elements include: a Fresnel lens, a lenticular lens, a polarizing plate, a color filter, a band pass filter, a dichroic filter, a long pass filter, a short pass filter, a mirror, and the like.

E. Fifth Embodiment—Correction of Chromatic Aberration by Lens

In the first embodiment above, prism block 100 corrects the chromatic aberration through the curved shapes of third interface 130 and fourth interface 132. Prism block 100B according to the present embodiment employs a lens inserted in a notch to correct a chromatic aberration of the light flux caused at an interface.

Figure 5A:
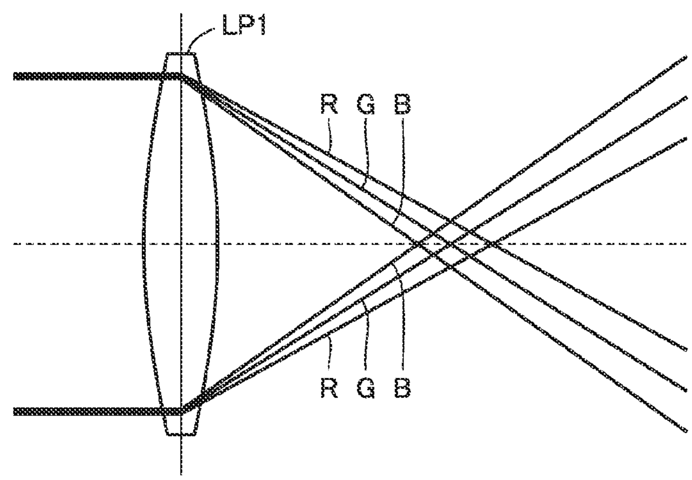
FIG. 5A illustrates correction of a chromatic aberration using a lens.
Figure 5B:
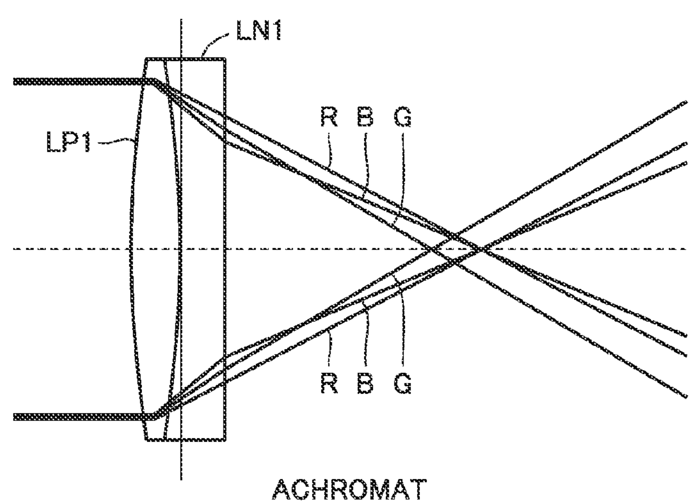
FIG. 5B illustrates correction of a chromatic aberration using an achromat lens.
Figure 5C:
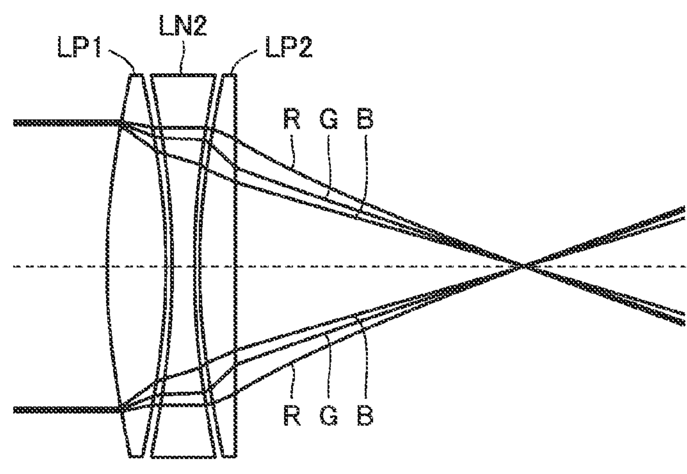
FIG. 5C illustrates correction of a chromatic aberration using an apochromat lens.

Each of FIG. 5A to FIG. 5C illustrates the correction of the chromatic aberration using a lens. Light has such characteristics that its refractive index becomes higher as its wavelength is shorter. Hence, focal distances of beams of light having passed through a lens LP1 with positive power and corresponding to wavelengths of R (red), G (green), and B (blue) differ from each other as shown in FIG. 5A. Specifically, the beam of light of B has the shortest focal distance, whereas the beam of light of R has the longest focal distance.

Hence, in order to correct this chromatic aberration, lens LP1 with positive power and a lens LN1 with negative power are inserted in notch 150 as shown in FIG. 5B. By the combination (achromat lens) of the lenses, the chromatic aberration between R and B can be corrected.

Moreover, in another aspect, a configuration (apochromat lens) may be employed in which lens LN1 with negative power is interposed between lenses LP1 and LP2 with positive power as shown in FIG. 5C. According to the configuration above, the chromatic aberration among the 3 colors of R, G, and B can be corrected.

The combinations of the lenses for correcting the chromatic aberration are not limited to the examples shown in FIG. 5B and FIG. 5C. Moreover, the combinations of the lenses shown in FIG. 5B and FIG. 5C may be disposed in a distributed manner among a plurality of notches. The lens for correcting the chromatic aberration is preferably composed of fluorite or glass having extraordinary low dispersion characteristics.

F. Sixth Embodiment—Notch Configured Such that Optical Element can be Disposed Therein Prism block 100B according to the present embodiment is provided with at least one notch configured such that an optical element can be disposed therein. With reference to FIG. 4, notch 156 of prism block 100B is configured such that an optical element can be disposed on the optical path between a fifth interface 122 and a sixth interface 124 of notch 156. Fifth interface 122 serves as an exit surface and sixth interface 124 serves as a re-entrance surface.

In the present embodiment, as one example, notch 156 is provided with a groove 157 for holding lens 210 serving as the optical element. Groove 157 is configured to be engaged with lens 210. Accordingly, lens 210 can be readily installed at a predetermined position and positional precision can be secured.

In another aspect, the notch may be provided with a projection portion or a combination of recess and projection instead of groove 157 (recess), and may be configured such that this portion can be engaged with the lens.

In still another aspect, the holding portion provided in the notch may be configured to hold a jig configured to be connectable to the optical element.

G. Seventh Embodiment—Prism Block as Alternative for Mirror

A conventional scanner optical system employs a configuration for folding an optical path of a reduction optical system using a mirror (reflector). This is defined as a “mirror scanner”. In a scanner optical system 1A according to the present embodiment, the prism block described above serves to play the role conventionally played by the mirror in the mirror scanner. It should be noted that the basic configuration of scanner optical system 1A according to the present embodiment is substantially the same as that of the scanner optical system of the first embodiment, and therefore the following describes only a difference therebetween.

(g1. Scanner Optical System 1A)

Figure 6:
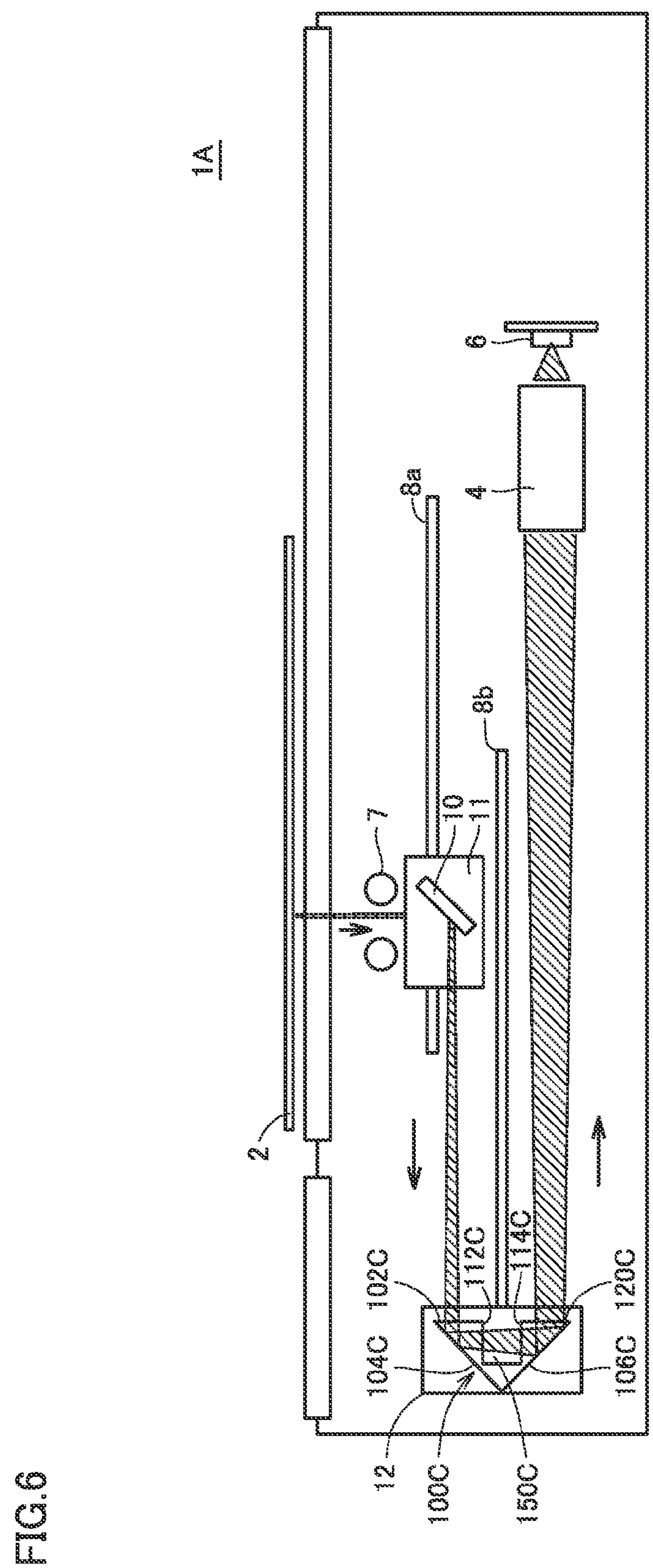
FIG. 6 illustrates an exemplary configuration of a scanner optical system according to a seventh embodiment.

FIG. 6 illustrates an exemplary configuration of scanner optical system 1A according to the seventh embodiment. With reference to FIG. 6, an image formation lens 4C and an image capturing element 6 are fixed to predetermined positions.

In order to scan image information of a document 2, a light flux is emitted from light source 7 to document 2. Upon the emission of the light flux from light source 7, a first slider 11 having a reflection mirror 10 fixed thereto and a second slider 12 having prism block 100C fixed thereto are moved in parallel with the document surface by an actuator (not shown) with first slider 11 and second slider 12 being engaged with rails 8*a*, 8*b*.

The light flux reflected by document 2 is reflected by reflection mirror 10. The light flux reflected by reflection mirror 10 enters prism block 100C via its entrance surface 102C.

The light flux totally reflected in prism block 100C exits to outside of prism block 100C, and then enters image formation lens 4.

Image formation lens 4 forms an image on image capturing element 6 using the light flux received from prism block 100C. Accordingly, the light flux is photoelectrically converted by image capturing element 6, and is then output as image information.

(g2. Prism Block 100C)

Prism block 100C is provided with notch 150C. Notch 150C extends in the same direction as the long side direction (main scanning direction) of prism block 100C. Hereinafter, a behavior of the light flux in prism block 100C will be described.

The light flux having entered via entrance surface 102C of prism block 100C is totally reflected by reflection surface 104C. The light thus totally reflected by reflection surface 104C exits to the outside of prism block 100C via first interface 112C. The light flux thus having exited via first interface 112C re-enters prism block 100C via second interface 114 facing first interface 112C.

The light flux thus having re-entered via second interface 114C is totally reflected by reflection surface 106C, and exits to the outside of prism block 100C via final exit surface 120C to travel toward image formation lens 4.

In the present embodiment, in an optical path on a cross section orthogonal to the main scanning direction of prism block 100C, each of reflection surfaces 104C, 106C is configured such that the light flux is incident thereon at an incident angle of 45°.

Moreover, in the present embodiment, first interface 112C and second interface 114C are configured to be orthogonal to the optical axis of the light flux.

According to the description above, since prism block 100C is provided with notch 150C, the decrease (optical loss) of amount of light by the medium can be suppressed.

Moreover, in a conventional mirror scanner, for reflected light from reflection mirror 10, two mirrors need to be disposed at an angle of 90° relative to each other instead of prism block 100C. Specifically, the mirrors need to be disposed at the respective positions of reflection surfaces 104C, 106C of prism block 100C.

Since these two mirrors need to be disposed at an angle of 90° relative to each other precisely in the mirror scanner, it takes time for adjustment, disadvantageously. Regarding this point, prism block 100C according to the present embodiment is configured such that reflection surfaces 104C and 106C are at an angle of 90° relative to each other in advance. Thus, no adjustment of the reflection surfaces is required in prism block 100C. This configuration can reduce time required to adjust scanner optical system 1A including prism block 100C.

Although the technical idea has been described and illustrated in detail, it is clearly understood that the same is by way of illustration and example only and is not to be taken by way of limitation, the scope of the present invention being interpreted by the terms of the appended claims.

What is claimed is:

1. A prism block comprising:

an entrance surface configured to receive a light flux into the prism block;

a final exit surface configured to allow for exit of the light flux from the prism block, the light flux reflecting in the prism block at least once between the entrance surface and the exit surface; and a notch including a first notch surface and a second notch surface, the first notch surface and the second notch surface defining an air gap therebetween, the first notch surface including a first interface and the second notch surface including a second interface facing the first interface;

wherein the notch is configured to propagate the light flux across the air gap on an optical path between the first interface and the second interface, wherein the light flux exits from inside the prism block at the first interface and the light flux re-enters the prism block at the second interface.

2. The prism block according to claim 1, wherein at least one of the first and second interfaces is formed to have a curved shape for diffusing or converging the light flux.

3. The prism block according to claim 2, wherein the curved shape is configured to correct a chromatic aberration of the light flux.

4. The prism block according to claim 1, wherein each of the first and second interfaces has an incidence surface on which the light flux is incident, the incidence surface being provided orthogonal to an optical axis of the light flux.

5. The prism block according to claim 1, wherein in the optical path from the entrance of the light flux via the first portion to the exit of the light flux via the second portion, the prism block is configured to permit the light flux to be incident on a reflection surface at an incident angle of 45°, the reflection surface serving as an interface between inside and outside of the prism block.

6. The prism block according to claim 1, wherein the prism block is configured such that an optical element is able to be disposed on an optical path from the first interface to the second interface.

7. The prism block according to claim 1, wherein the prism block is provided by integral molding.

8. The prism block according to claim 1, wherein the prism block is constituted of a combination of a plurality of prisms.

9. An optical unit comprising:

an optical element; and a prism block comprising:

an entrance surface configured to receive a light flux into the prism block;

a final exit surface configured to allow for exit of the light flux from the prism block, the light flux reflecting in the prism block at least once between the entrance surface and the exit surface; and a notch including a first notch surface and a second notch surface, the first notch surface and the second notch surface defining an air gap therebetween, the first notch surface including a first interface and the second notch surface including a second interface facing the first interface;

wherein the notch is configured to propagate the light flux across the air gap on an optical path between the first interface and the second interface, wherein the light flux exits from inside the prism block at the first interface and the light flux re-enters the prism block at the second interface.

10. The optical unit according to claim 9, comprising a third optical element on an optical path from the first interface to the second interface.

11. The optical unit according to claim 9, wherein the first, second, or third optical element includes a lens for correcting a chromatic aberration of the light flux.

12. A scanner optical system comprising:

a light source configured to emit a light flux to a document to be scanned; and a prism block comprising:

an entrance surface configured to receive a light flux into the prism block;

a final exit surface configured to allow for exit of the light flux from the prism block, the light flux reflecting in the prism block at least once between the entrance surface and the exit surface; and a notch including a first notch surface and a second notch surface, the first notch surface and the second notch surface defining an air gap therebetween, the first notch surface including a first interface and the second notch surface including a second interface facing the first interface;

wherein the notch is configured to propagate the light flux across the air gap on an optical path between the first interface and the second interface, wherein the light flux exits from inside the prism block at the first interface and the light flux re-enters the prism block at the second interface.

13. The scanner optical system according to claim 12, wherein among surfaces of the prism block, a surface on which the light flux is not incident is configured to be in parallel with an optical axis of the light flux close to the surface.

14. The scanner optical system according to claim 12, wherein a width of the prism block is configured to be narrower on the optical path from the entrance of the light flux via the first portion to the exit of the light flux via the second portion.

* * * * *